(12) United States Patent
Morimoto

(10) Patent No.: US 7,710,126 B2
(45) Date of Patent: May 4, 2010

(54) CAPACITANCE TYPE SENSOR

(75) Inventor: Hideo Morimoto, Yamatokooriyama (JP)

(73) Assignee: Nitta Corporation, Osaka (JP)

( * ) Notice: Subject to any disclaimer, the term of this patent is extended or adjusted under 35 U.S.C. 154(b) by 282 days.

(21) Appl. No.: 11/909,077

(22) PCT Filed: Mar. 18, 2005

(86) PCT No.: PCT/JP2005/004985

§ 371 (c)(1),
(2), (4) Date: Sep. 18, 2007

(87) PCT Pub. No.: WO2006/100725

PCT Pub. Date: Sep. 28, 2006

(65) Prior Publication Data

US 2009/0201031 A1    Aug. 13, 2009

(51) Int. Cl.
*G01R 27/26* (2006.01)
*G01L 1/00* (2006.01)
(52) U.S. Cl. .............. 324/661; 73/780; 73/862.043
(58) Field of Classification Search .......... 324/661, 324/658, 649, 600, 660, 662, 663, 671, 674, 324/678, 681, 686, 688, 765; 73/780, 862.043
See application file for complete search history.

(56) References Cited

U.S. PATENT DOCUMENTS

| | | | | |
|---|---|---|---|---|
| 6,530,283 B2 * | 3/2003 | Okada et al. | ............ | 73/780 |
| 6,820,494 B2 * | 11/2004 | Morimoto | ............ | 73/780 |
| 6,842,015 B2 * | 1/2005 | Morimoto | ............ | 324/662 |
| 6,958,614 B2 * | 10/2005 | Morimoto | ............ | 324/661 |
| 6,989,677 B2 * | 1/2006 | Morimoto | ............ | 324/660 |
| 7,064,561 B2 * | 6/2006 | Morimoto | ............ | 324/691 |
| 7,372,281 B2 * | 5/2008 | Morimoto | ............ | 324/661 |

FOREIGN PATENT DOCUMENTS

| | | |
|---|---|---|
| JP | 2001-91382 | 4/2001 |
| JP | 2002-107245 | 4/2002 |

(Continued)

OTHER PUBLICATIONS

International Search Report w/ English Translation for PCT/JP2005/004985 mailed Jun. 14, 2005 (4 pages).

(Continued)

*Primary Examiner*—Hoai-An D Nguyen
(74) *Attorney, Agent, or Firm*—Osha • Liang LLP

(57) ABSTRACT

A capacitance type sensor good in operability and less in erroneous operation is provided. Switches SW1-SW4 are formed between a displacement electrode 40 and switch electrodes E11-E14 kept at a predetermined potential and grounded switch electrodes E15-E18. Switches SW11-SW14 and SW51-SW55 are connected to respective capacitance electrodes E1-E4 that cooperate with the displacement electrode 40 to form capacitance elements. A decision circuit judges states of the switches SW1-SW4. When at least one of the switches SW1-SW4 is off, an X-axial output is calculated based on the capacitance values of the capacitance elements C1 and C2, and a Y-axial output is calculated based on the capacitance values of the capacitance elements C3 and C4. When any of the switches SW1-SW4 is on, a Z-axial output is calculated based on the sum of the capacitance values of the capacitance elements C1 to C4.

4 Claims, 9 Drawing Sheets

FOREIGN PATENT DOCUMENTS

| JP | 2002-268817 | 9/2002 |
| JP | 2003-131786 | 5/2003 |
| WO | 02/073148 | 9/2002 |

OTHER PUBLICATIONS

Notification of Transmittal of Translation of the International Preliminary Report on Patentability (Chapter I or Chapter II of the Patent Cooperation Treaty) for International Application No. PCT/JP2005/004985 mailed Sep. 27, 2007, 6 pages.

International Search Report w/ English Translation for PCT/JP2005/004984 mailed Jun. 14, 2005 (4 pages).

Notification of Transmittal of Copies of Translation of the International Preliminary Report on Patentability (Chapter I or Chapter II of the Patent Cooperation Treaty) for International Application No. PCT/JP2005/004984 mailed Sep. 27, 2007, 6 pages.

* cited by examiner

CAPACITANCE TYPE SENSOR

TECHNICAL FIELD

The present invention relates to a capacitance type sensor suitable for detecting a force externally applied.

BACKGROUND ART

A capacitance type sensor is generally used for converting into an electric signal the magnitude and direction of a force applied by an operator. For example, in an input device for a computer, a capacitance type sensor for inputting a multidimensional operation is incorporated as a so-called joystick.

With the capacitance type sensor, an operation quantity having a predetermined dynamic range can be input as the magnitude of a force applied by the operator. In addition, such a capacitance type sensor is also used as a two- or three-dimensional sensor capable of resolving into each dimensional component an applied force to be detected. In particular, capacitance type force sensors in which a capacitance element is formed between two electrodes to detect a force on the basis of a change in capacitance value caused by a change in the distance between the electrodes, have been put into practical use in various fields because they have a merit that the construction can be simplified to intend to reduce the cost.

In a capacitance type sensor, fixed electrodes on the X-axis, fixed electrodes on the Y-axis, and a fixed electrode on the Z-axis surrounded by the X- and Y-axial fixed electrodes, cooperate with a movable electrode to form variable capacitance elements, for example, see Patent document 1. In the capacitance type sensor, for example, when an X-axial force Fx is applied to an operation portion, the distance between a fixed electrode on the X-axis and the movable electrode is decreased to increase the capacitance value of the capacitance element formed by the electrodes. Therefore, by detecting the change in the capacitance value of the capacitance element, an X-axial signal corresponding to the X-axial force Fx can be output.

Patent Document 1: Japanese Patent Unexamined Publication No. 2001-91382

DISCLOSURE OF THE INVENTION

Problem that the Invention is to Solve

In the above capacitance type sensor, however, an X-axial signal corresponding to an X-axial force Fx, a Y-axial signal corresponding to a Y-axial force Fy, and a Z-axial signal corresponding to a Z-axial force Fz, are always output when any force is applied to the operation portion. Therefore, when only the X- or Y-axial output is intended to be changed, the Z-axial output may also change. On the other hand, when only the Z-axial output is intended to be changed, the X- or Y-axial output may also change.

For example, in the case that the capacitance type sensor is applied to a joystick for moving a cursor on the basis of X- and Y-axial outputs, and performing a predetermined operation such as clicking on the basis of a Z-axial output, the cursor is moved to a predetermined position, for example, on an icon, by changing the X- and Y-axial outputs, and then the predetermined operation is performed by changing the Z-axial output. In this case, however, when a force is applied for moving the cursor, the predetermined operation may be erroneously performed because not only the X- and Y-axial outputs but also the Z-axial output changes. On the other hand, when a force is applied for performing the predetermined operation, the cursor may be moved because not only the Z-axial output but also the X- and Y-axial outputs change. This makes it difficult to perform the predetermined operation with keeping the cursor at the predetermined position.

An object of the present invention is to provide a capacitance type sensor good in operability and less in erroneous operation.

Means for Solving the Problem and Effect of the Invention

A capacitance type sensor of the present invention comprises a substrate that defines an XY plane; a detective member opposed to the substrate; a conductive member disposed between the substrate and the detective member with being kept in an insulating state so that the conductive member can be displaced in the same direction as the detective member when the detective member is displaced along a Z-axis perpendicular to the substrate; an X-axial electrode formed on an X-axis on the substrate so as to cooperate with the conductive member to form a first capacitance element; a Y-axial electrode formed on a Y-axis on the substrate so as to cooperate with the conductive member to form a second capacitance element; a plurality of first switch electrodes disposed so as to be distant from the conductive member and kept at a ground potential; and a plurality of second switch electrodes disposed so as to be distant from the conductive member and cooperate with the respective first switch electrodes to make pairs, and kept at a potential different from the ground potential. The conductive member can be displaced toward the X- and Y-axial electrodes with displacement of the detective member, and come into contact with a plurality of pairs of first and second switch electrodes. The displacement of a portion of the detective member corresponding to an X-axial direction can be detected on the basis of detection of a change in the capacitance value of the first capacitance element due to a change in the distance between the conductive member and the X-axial electrode, by using only a signal input to the X-axial electrode, and the displacement of a portion of the detective member corresponding to a Y-axial direction can be detected on the basis of detection of a change in the capacitance value of the second capacitance element due to a change in the distance between the conductive member and the Y-axial electrode, by using only a signal input to the Y-axial electrode, when the conductive member is not in contact with at least one of the plurality of pairs of first and second switch electrodes. The displacement of the detective member can be detected on the basis of detection of a change in the sum of the capacitance values of the first and second capacitance elements due to changes in the distances between the conductive member and the X- and Y-axial electrodes, by using both of signals input to the respective X- and Y-axial electrodes, when the conductive member is in contact with all of the plurality of pairs of first and second switch electrodes.

According to the above aspect, when the conductive member is not in contact with at least one of the plurality of pairs of first and second switch electrodes, the displacement of the portion of the detective member corresponding to the X-axial direction is detected by using only the signal input to the X-axial electrode, and the displacement of the portion of the detective member corresponding to the Y-axial direction is detected by using only the signal input to the Y-axial electrode. On the other hand, when the conductive member is in contact with all of the plurality of pairs of first and second switch electrodes, the displacement of the detective member is detected by using both of the signals input to the respective X- and Y-axial electrodes. That is, in accordance with the contact states between the conductive member and the plurality of pairs of first and second switch electrodes, the displacements of the different portions of the detective member are detected. Thus, outputs based on the respective X- and Y-axial electrodes and an output based on both of the X- and Y-axial electrodes are exclusively output. As a result, the operability is improved and erroneous operations are reduced.

The capacitance type sensor of the present invention may comprise a pair of X-axial electrodes being X-axially distant from each other so as to be symmetrical with respect to the Y-axis; and a pair of Y-axial electrodes being Y-axially distant from each other so as to be symmetrical with respect to the X-axis.

According to the above aspect, X- and Y-axial forces can accurately be detected.

In the capacitance type sensor of the present invention, the plurality of pairs of first and second switch electrodes may be disposed at positions corresponding to the respective X- and Y-axial electrodes.

According to the above aspect, the positions of the switches constituted by the plurality of pairs of first and second switch electrodes correspond to operation directions. Therefore, the operability is more improved.

Best Form for Carrying Out the Invention

Hereinafter, preferred embodiments of the present invention will be described with reference to drawings. In the embodiments as will be described below, a capacitance type sensor of the present invention is applied to a joystick, as a pointing device, for moving a cursor that is being displayed on a computer display screen, and for performing an operation using the cursor.

FIG. 1 is a schematic sectional view of a capacitance type sensor according to a first embodiment of the present invention. FIG. 2 is an upper view of a displacement electrode of the capacitance type sensor of FIG. 1. FIG. 3 is a view showing an arrangement of a number of electrodes formed on a substrate of the capacitance type sensor of FIG. 1.

The capacitance type sensor 10 includes a substrate 20; a detective member 30 to be operated by a human or the like, and thereby receiving an external force; a displacement electrode 40; capacitance electrodes E1 to E4 formed on the substrate 20 though FIG. 1 shows only E1 and E2; switch electrodes E11 to E18 though FIG. 1 shows only E11 and E12; an insulating film 50 formed so as to be in close contact with a number of electrodes and cover the corresponding part of the upper surface of the substrate 20; a supporting member 60 to support the detective member 30 and the displacement electrode 40 on the substrate 20; and a fixing member 70 disposed so as to cover the periphery of the supporting member 60 to fix the supporting member 60 to the substrate 20.

In this example, an XYZ three-dimensional coordinate system is defined as shown in FIGS. 1 to 3 for convenience of explanation, and the arrangement of components will be explained with reference to the coordinate system. More specifically, in FIG. 1, the origin O is defined on the substrate 20 at the center of the capacitance electrodes E1 to E4; the X-axis is defined so as to extend horizontally rightward; the Z-axis is defined so as to extend vertically upward; and the Y-axis is defined so as to extend backward perpendicularly to FIG. 1. Thus, the upper surface of the substrate 20 is on the XY plane. The Z-axis extends through the center of the capacitance electrodes E1 to E4 on the substrate 20, and the respective centers of the detective member 30 and the displacement electrode 40.

The substrate 20 is made of a general printed circuit board for an electronic circuit. In this embodiment used is a glass epoxy substrate. In a modification, a film substrate made of, for example, a polyimide film, may be used. In the modification, however, because the film substrate is flexible, it is preferably used by being disposed on a support base sufficient in rigidity.

The detective member 30 is fixed on the upper surface of the supporting member 60. The detective member 30 is made up of a small-diameter upper step portion 31 as a force receiving portion, and a large-diameter lower step portion 32 integrally formed under the upper step portion 31. The detective member 30 is disk-shaped as a whole. In this embodiment, the diameter of the upper step portion 31 is substantially equal to the diameter of a circle made by connecting the outermost curves of the respective capacitance electrodes E1 to E4. The diameter of the lower step portion 32 is larger than the diameter of the circle made by connecting the outermost curves of the respective capacitance electrodes E1 to E4. Marks for indicating directions of operation, that is, directions of movement of a cursor, are formed on the upper surface of the upper step portion 31 of the detective member 30 so as to correspond to the respective positive and negative directions of the X and Y-axes, that is, to correspond to the respective capacitance electrodes E1 to E4.

The displacement electrode 40 is formed into a disk shape having its diameter substantially equal to the diameter of the circle made by connecting the outermost curves of the respective capacitance electrodes E1 to E4. Four circular protrusions 41 to 44 are formed on the lower surface of the displacement electrode 40. The four protrusions 41 to 44 are formed on the lower surface of the displacement electrode 40 near the peripheral edge of the displacement electrode 40 so as to correspond to the X-axial positive direction, the X-axial negative direction, the Y-axial positive direction, and the Y-axial negative direction, respectively. Each of the four protrusions 41 to 44 is formed into a circular shape having its diameter equal to the diameter of a pair of switch electrodes, as shown in FIG. 3. For example, the protrusion 41 has its diameter equal to the diameter of a circle made by connecting the outermost curves of the switch electrodes E11 and E15. The displacement electrode 40 is made of conductive silicone rubber. The displacement electrode 40 is attached to the lower surface of the supporting member 60, which is made of elastic silicone rubber. Thus, when a Z-axial negative force is applied to the detective member 30, the displacement electrode 40 is displaced in the Z-axial negative direction with the detective member 30.

As shown in FIG. 3, on the substrate 20, there are formed substantially fan-shaped capacitance electrodes E1 to E4 arranged around the origin O and having, near their outer peripheral edges, substantially circular cutouts H1 to H4, respectively; and substantially semicircular switch electrodes E11 to E18 each having its diameter smaller than the corresponding one of the cutouts H1 to H4 and disposed within the corresponding one of the cutouts H1 to H4. The capacitance electrodes E1 to E4 and the switch electrodes E11 to E18 are connected through through-holes or the like to respective terminals T1 to T4 and T11 to T18, as shown in FIG. 4. The terminals can be connected to an electronic circuit.

A pair of capacitance electrodes E1 and E2 are X-axially distant from each other so as to be symmetrical with respect to the Y-axis. A pair of capacitance electrodes E3 and E4 are Y-axially distant from each other so as to be symmetrical with respect to the X-axis. In this embodiment, the capacitance electrode E1 is disposed so as to correspond to the X-axial positive direction while the capacitance electrode E2 is disposed so as to correspond to the X-axial negative direction. Thus, these electrodes are used for detecting the X-axial component of an external force. On the other hand, the capacitance electrode E3 is disposed so as to correspond to the Y-axial positive direction while the capacitance electrode E4 is disposed so as to correspond to the Y-axial negative direction. Thus, these electrodes are used for detecting the Y-axial component of the external force.

The switch electrodes E11 to E14 are kept at a predetermined potential different from the ground potential. The switch electrodes E15 to E18 are grounded. The switch electrodes E11 to E14 and the switch electrodes E15 to E18 are disposed so as to make pairs. For example, the switch electrode E11 and the switch electrode E15 makes a pair. They are disposed so as to correspond to the X-axial positive direction and be symmetrical with respect to the X-axis. The same applies to the other switch electrodes.

The insulating film 50, which is an insulating resist film, is formed so as to be in close contact with the capacitance electrodes E1 to E4 on the substrate 20 and cover the electrodes. Therefore, the capacitance electrodes E1 to E4, each made of a copper foil or the like, are not exposed to air. Thus, the insulating film 50 prevents the capacitance electrodes E1 to E4 from being oxidized. In addition, because of the provision of the insulating film 50, the displacement electrode 40 never comes into direct contact with the capacitance electrodes E1 to E4. For preventing rust and oxidation, the surface of each of the switch electrodes E11 to E18 may be plated with gold, or coated with a conductive film such as solder.

In the case of applying the capacitance type sensor 10 to a joystick, the size, material, and hardness of the displacement electrode 40, the shape of the detective member 30, and each size of the capacitance electrodes E1 to E4, are preferably set to the respective optimum values because those conditions influence the operational feeling.

Next, a circuit construction of the capacitance type sensor 10 of this embodiment constructed as described above will be described with reference to FIG. 4. FIG. 4 is a circuit diagram showing a circuit construction of the capacitance type sensor shown in FIG. 1. In FIG. 4, a portion corresponding to the above-described construction is enclosed with a broken line. The outside of the broken line corresponds to an electronic circuit. In FIG. 4, the terminals T1 to T4 and T11 to T18 are terminals connected through through-holes or the like to the capacitance electrodes E1 to E4 and the switch electrodes E11 to E18.

Because the displacement electrode 40 is kept distant from the respective capacitance electrodes E1 to E4 with being opposed parallel to the respective capacitance electrodes E1 to E4, the displacement electrode 40 cooperates with the respective capacitance electrodes E1 to E4 to form capacitance elements C1 to C4. Each of the capacitance elements C1 to C4 is a variable capacitance element whose capacitance value changes due to displacement of the displacement electrode 40.

The displacement electrode 40 can selectively takes positions where the displacement electrode 40 is in contact with the switch electrodes E11 to E14 and the switch electrodes E15 to E18, and positions where the displacement electrode 40 is not in contact with the switch electrodes E11 to E14 and the switch electrodes E15 to E18. Thus, the displacement electrode 40 cooperates with the respective switch electrodes E11 to E14 and the respective switch electrodes E15 to E18 to form switches SW1 to SW4. In this embodiment, each of the switch electrodes E11 to E14 is kept at a power supply voltage Vcc through a pull-up resistance element R, and connected to an input terminal of a decision circuit. Any of the switch electrodes E15 to E18 is grounded. In accordance with the states of the switches SW1 to SW4, the displacement electrode 40 is switched over between an insulating state and a non-insulating state.

Therefore, when the displacement electrode 40 is in contact with at least one of the switch electrodes E11 to E14 and the switch electrodes E15 to E18, that is, when at least one of the switches SW1 to SW4 is on, the displacement electrode 40 is put at the ground potential. A difference in potential is then produced between the displacement electrode 40 and each of the capacitance electrodes E1 to E4. In accordance with the difference in potential, each of the capacitance elements C1 to C4 is charged. On the other hand, when the displacement electrode 40 is not in contact with any of the switch electrodes E11 to E14 and the switch electrodes E15 to E18, that is, when any of the switches SW1 to SW4 is off, any of the capacitance elements C1 to C4 is not charged because the displacement electrode 40 is in an insulating state.

If the displacement electrode 40 comes into contact only with one of the switch electrodes E11 to E14, the displacement electrode 40 is put at the potential of the power supply voltage. However, in consideration of the displacement electrode 40 having a soft elastic body made of conductive silicone rubber, and the shape of the displacement electrode 40, it is unlikely that the displacement electrode 40 comes into contact only with one of the switch electrodes E11 to E14 without coming into contact with any of the switch electrodes E15 to E18. Therefore, because the displacement electrode 40 comes into contact with the switch electrodes E11 to E14 and the switch electrodes E15 to E18 substantially at the same time, it is thinkable that the displacement electrode 40 is put at the ground potential.

Switches SW11 to SW14 are connected to the respective terminals T1 to T4 connected to the respective capacitance electrodes E1 to E4. Switches SW51 to SW54 are connected to the respective terminals T51 to T54 connected to the respective capacitance electrodes E1 to E4. One terminal of each of the switches SW11, SW13, and SW51 to 54, that is, the terminal distant from each of the terminals T1 to T4, is connected to a terminal T100. One terminal of each of the switches SW12 and SW14, that is, the terminal distant from each of the terminals T2 and T4, is connected to a terminal T101. Therefore, when a periodic signal S1 is being input to the terminal T100 and the switches SW11 and SW13 are turned on, the periodic signal S1 is input to the respective capacitance electrodes E1 and E3 constituting the respective capacitance elements C1 and C3. When the periodic signal S1 is being input to the terminal T100 and the switches SW51 to SW54 are turned on, the periodic signal S1 is input to the respective capacitance electrodes E1 to E4 constituting the respective capacitance elements C1 to C4. When a periodic signal S2 is being input to the terminal T101 and the switches SW12 and SW14 are turned on, the periodic signal S2 is input to the respective capacitance electrodes E2 and E4 constituting the respective capacitance elements C2 and C4.

The decision circuit has a construction as shown in FIG. 5. After passing through a NOT circuit, that is, an inverting circuit, an AND operation is performed. On the basis of the result, output signals are output from two output terminals SL1 and SL2. In this embodiment, in the decision circuit, when the input of any NOT circuit is Lo, a Hi signal is output from the output terminal SL2, and a Lo signal as a signal inverted to the Hi signal to be output from the terminal SL2, is output from the terminal SL1.

That is, when any of the switches SW1 to SW4 is on, a Lo signal is output from the output terminal SL1 and a Hi signal is output from the output terminal SL2. On the other hand, when at least one of the switches SW1 to SW4 is off, a Hi signal is output from the output terminal SL1 and a Lo signal is output from the output terminal SL2.

The states of the switches SW11 to SW14 and SW51 to SW54 are controlled substantially at the same time on the basis of the signals output from the decision circuit. The switches SW11 to SW14 are controlled on the basis of the signal output from the output terminal SL1. When a Lo signal is output from the output terminal SL1, the switches are turned off. When a Hi signal is output from the output terminal SL1, the switches are turned on. On the other hand, the switches SW51 to SW54 are controlled on the basis of the signal output from the output terminal SL2. When a Hi signal is output from the output terminal SL2, the switches are turned on. When a Lo signal is output from the output terminal SL2, the switches are turned off.

As described above, the switches SW11 to SW14 are controlled so as to be put in the same state, and the switches SW51 to SW54 are controlled so as to be put in the same state. On the other hand, the switches SW11 to SW14 and the switches SW51 to SW54 are controlled so as to be put in the states opposite to each other. That is, when any of the switches SW11 to SW14 is on, any of the switches SW51 to SW54 is off. When any of the switches SW11 to SW14 is off, any of the switches SW51 to SW54 is on. Thus, all of the switches SW11 to SW14 and SW51 to SW54 are never turned on at the same time.

Next will be discussed a case wherein a force is applied so as to depress an X-axial positive portion of the detective member 30. FIG. 6 is a sectional view when a force is applied to the X-axial positive portion of the detective member of the capacitance type sensor shown in FIG. 1.

As shown in FIG. 6, when a portion of the detective member 30 corresponding to the X-axial positive direction is depressed, the protrusion 41 of the displacement electrode 40 corresponding to the X-axial positive direction is displaced downward to come into contact with the switch electrodes E11 and E15. Thereby, the switch SW1 is turned on to put the displacement electrode 40 at the ground potential. At this time, because the switch SW3 is kept off, a Hi signal is output from the output terminal SL1 of the decision circuit to turn the switches SW11 to SW14 on, and a Lo signal is output from the output terminal SL2 of the decision circuit to turn the switches SW51 to SW54 off. Therefore, the periodic signals S1 and S2 are input to the capacitance electrodes E1 to E4 constituting the respective capacitance elements C1 to C4, to charge the capacitance elements C1 to C4.

When the distances between the electrodes of the capacitance elements C1 to C4 change, the capacitance values of the capacitance elements C1 to C4 change accordingly. In general, the capacitance value of a capacitance element is in inverse proportion to the distance between the electrodes of the capacitance element. When the portion of the detective member 30 corresponding to the X-axial positive direction is depressed, the distance between the capacitance electrode E1 constituting the capacitance element C1 and the displacement electrode 40 becomes the smallest while the distance between the capacitance electrode E2 constituting the capacitance element C2 and the displacement electrode 40 becomes the largest. The distance between the capacitance electrode E3 constituting the capacitance element C3 and the displacement electrode 40, and the distance between the capacitance electrode E4 constituting the capacitance element C4 and the displacement electrode 40, are midway between the above distances. Thus, the capacitance values of the capacitance elements C1 to C4 are given by the following expression:

C2<C3 nearly equal to C4<C1.

On the other hand, as described above, a Lo signal is output from the output terminal SL2 of the decision circuit and the switches SW 51 to SW54 are off.

Actually, even when an X-axial positive force is applied to the displacement electrode 40, the protrusions 43 and 44 of the displacement electrode 40 corresponding to the respective Y-axial positive and negative directions may be displaced downward in accordance with conditions of the manner of applying the force to the detective member 30, the magnitude of the force, the size and rigidity of the displacement electrode 40, and so on. The protrusions 43 and 44 then come into contact with the switch electrodes E13 and F17 and the switch electrodes E14 and E18 to turn the switches SW3 and SW4 on. However, this brings about no problem on the principle of operation. Cases wherein forces are applied to depress portions of the detective member 30 corresponding to the X-axial negative direction, the Y-axial positive direction, and the Y-axial negative direction, are similar to the case wherein the force is applied to depress the portion of the detective member 30 corresponding to the X-axial positive direction. Thus, the discussions of the cases are omitted.

Next will be discussed a case wherein a force is applied to depress a central portion of the detective member 30. FIG. 7 is a sectional view when a force is applied to a central portion of the detective member of the capacitance type sensor shown in FIG. 1.

As shown in FIG. 7, when a central portion of the detective member 30 is depressed, all of the protrusions 41 to 44 of the displacement electrode 40 are displaced downward to come into contact with the respective switch electrodes E11 to E14 and E15 to E18. Thereby, all of the switches SW1 to SW4 are turned on to put the displacement electrode 40 at the ground potential. At this time, a Lo signal is output from the output terminal SL1 of the decision circuit to turn the switches SW11 to SW14 off, and a Hi signal is output from the output terminal SL2 of the decision circuit to turn the switches SW51 to SW54 on. Therefore, the periodic signals S1 and S2 are input to the capacitance electrodes E1 to E4 constituting the respective capacitance elements C1 to C4, to charge the capacitance elements C1 to C4.

The states of the switches SW1 to SW4, the signals output from the output terminals SL1 and SL2 of the decision circuit, the states of the switches SW11 to SW14 and SW51 to SW54, and the capacitance values of the capacitance elements C1 to C4, when forces are applied to depress the detective member 30 as described above, are put together in the following Table 1. In the Table 1, cases wherein an X-axial negative force and a Y-axial negative force are applied to the detective member 30 are omitted because they are similar to the respective cases wherein an X-axial positive force and a Y-axial positive force are applied to the detective member 30.

TABLE 1

|  | Force is applied to X-axial positive portion of detective member | | | | Force is applied to Y-axial positive portion of detective member | | | | Force is applied to central portion of detective member | No operation |
|---|---|---|---|---|---|---|---|---|---|---|
| SW1 | O | O | O | O | X | O | X | O | O | X |
| SW2 | X | X | X | X | X | X | O | O | O | X |
| SW3 | X | O | X | O | O | O | O | O | O | X |
| SW4 | X | X | O | O | X | X | X | X | O | X |
| SL1 | H | H | H | H | H | H | H | H | L | H |
| SL2 | L | L | L | L | L | L | L | L | H | L |
| SW11 to SW14 | O | O | O | O | O | O | O | O | X | O |
| SW51 to SW54 | X | X | X | X | X | X | X | X | O | X |
| C1 | ◎ | ◎ | ◎ | ◎ | O | O | O | O | ◎ | — |
| C2 | △ | △ | △ | △ | O | O | O | O | ◎ | — |
| C3 | O | O | O | O | ◎ | ◎ | ◎ | ◎ | ◎ | — |
| C4 | O | O | O | O | △ | △ | △ | △ | ◎ | — |

In the rows of the switches SW1 to SW4, SW11 to SW14, and SW51 to SW54 of the Table 1, a circle represents an ON state and a cross represents an OFF state. In the rows of the capacitance values of the capacitance elements C1 to C4, a double circle indicates that the capacitance value is the highest; the capacitance value lowers in the order of the marks of a circle and a triangle; and the mark of a hyphen indicates that the capacitance value scarcely changes.

A force applied to the detective member 30 can be detected on the basis of the capacitance values of the capacitance elements C1 to C4. More specifically, an X-axial force Fx, which causes a change in X-axial output, can be detected on the basis of the capacitance values of the capacitance elements C1 and C2. Thus, the X-axial output Vx corresponding to the X-axial force Fx is calculated by the following expression:

$$Vx = f(C1, C2) = kx(C1 - C2)$$

where kx is a constant.

A Y-axial force Fy, which causes a change in Y-axial output, can be detected on the basis of the capacitance values of the capacitance elements C3 and C4. Thus, the Y-axial output Vy corresponding to the Y-axial force Fy is calculated by the following expression:

$$Vy = f(C3, C4) = ky(C3 - C4)$$

where ky is a constant.

A Z-axial force Fz, which causes a change in Z-axial output, can be detected on the basis of the sum of the capacitance values of the capacitance elements C1 to C4. The quantity of a change in the sum of the capacitance values of the capacitance elements C1 to C4 is larger than the quantity of a change in the capacitance value of each of the capacitance elements C1 to C4. Thus, the Z-axial output Vz corresponding to the Z-axial force Fz is calculated by the following expression:

$$Vz = f(C1, C2, C3, C4)$$
$$= kz(C1 + C2 + C3 + C4)$$

where kz is a constant. When the fixed capacitance element C6 is used in the calculation of the Z-axial output Vz, the Z-axial output Vz corresponding to the Z-axial force Fz is calculated by the following expression:

$$Vz = f(C1, C2, C3, C4, C6)$$
$$= kz'(C1 + C2 + C3 + C4 - C6)$$

where kz' is a constant.

When a fixed electrode is provided on the opposite side of the displacement electrode 40 from the capacitance electrodes E1 to E4; the fixed electrode is connected to a switch SW55 to be controlled synchronously with the switches SW51 to SW54; the other switch terminal is connected to the terminal T101; and thereby a variable capacitance element C7 is formed between the displacement electrode 40 and the fixed electrode, the Z-axial output Vz corresponding to the Z-axial force Fz is calculated by the following expression:

$$Vz = f(C1, C2, C3, C4, C7)$$
$$= kz''(C1 + C2 + C3 + C4 - C7)$$

where kz'' is a constant.

Next, a signal processing circuit for deriving X-, Y-, and Z-axial outputs Vx, Vy, and Vz will be described with reference to FIG. 8. FIG. 8 is a circuit diagram showing an example of a signal processing circuit for the capacitance type sensor shown in FIG. 1. FIG. 8 shows a case wherein a fixed capacitance element C6 is provided and a Z-axial output Vz is detected on the basis of the capacitance values of the capacitance elements C1 to C4 and C6. In FIG. 8, the resistance elements R1 to R6 have relations given by the following expressions:

R1=R2, R3=R4, R5=R6.

In the signal processing circuit shown in FIG. 8, periodic signals S1 and S2 having a predetermined frequency are input from not-shown alternating signal oscillators to the respective terminals T100 and T101. The resistance elements R1, R3, and R5 are connected to the terminal T100. The resistance elements R2, R4, and R6 are connected to the terminal T101. EX-OR elements 81, 82, and 83, which are logical elements of exclusive-OR circuits, are connected to the output terminals of the resistance elements R1 and R2; the output terminals of the resistance elements R3 and R4; and the output terminals of the resistance elements R5 and R6, respectively. The output terminals of the EX-OR elements 81, 82, and 83 are connected to terminals T91 to T93 through low-pass filters LF1 to LF3, respectively. The output terminals of the resistance elements R1 to R4 are connected to the input terminals of switches SW11 to SW14, respectively. The output terminals of the switches SW11 to SW14 are connected to the capacitance elements C1 to C4, respectively. The output terminal of the resistance element R5 is connected to the input terminals of the switches SW51 to SW54. The output terminals of the switches SW51 to SW54 are connected to the capacitance elements C1 to C4, respectively. The output terminal of the resistance element R6 is connected to the capacitance element C6. FIG. 8 shows a state wherein the displacement electrode 40 constituting one electrode of each of the capacitance elements C1 to C4 is grounded.

Thus, in the signal processing circuit of FIG. 8, each of the capacitance element C1 and the resistance element R1; the capacitance element C2 and the resistance element R2; the capacitance element C3 and the resistance element R3; the capacitance element C4 and the resistance element R4; the capacitance elements C1 to C4 and the resistance element R5; and the capacitance element C6 and the resistance element R6, can form a CR delay circuit. For example, in the signal processing circuit for outputting an X-axial output, when the switches SW11 and SW12 are on, the periodic signals S1 and S2 being input to the respective terminals T100 and T101 receive predetermined delays from the CR delay circuit constituted by the capacitance element C1 and the resistance element R1 or the CR delay circuit constituted by the capacitance element C2 and the resistance element R2, and then join in the EX-OR element 81. The same applies to the signal processing circuit for outputting a Y-axial output Vy. In the signal processing circuit for outputting a Z-axial output, when the switches SW51 to SW54 are on, the periodic signals S1 and S2 being input to the respective terminals T100 and T101 receive predetermined delays from the CR delay circuit constituted by the capacitance elements C1 to C4 and the resistance element R5 or the CR delay circuit constituted by the capacitance element CC and the resistance element R6, and then join in the EX-OR element 83.

In the signal processing circuit of FIG. 8, even when the switches SW11 to SW 14 or SW51 to SW54 connected to the capacitance elements C1 to C4 are switched over from ON states to OFF states or from OFF states to ON states, there is no considerable change in the output converted into an analogue voltage if the capacitance values of capacitance elements in a pair are equal to each other.

Hereinafter, the reason will be described in detail. Here, only a case of the X-axial output Vx will be described. FIG. 9 is a timing chart showing the waveforms of the periodic signals at each terminal and each node of the signal processing circuit shown in FIG. 8.

In FIG. 9, (a) and (b) show the waveforms of the periodic signals S1 and S2 being input to the respective terminals T100 and T101. In this embodiment, the periodic signal S1 being input to the terminal T100 is a periodic signal having its duty ratio D0 of 50%, and the periodic signal S2 being input to the terminal T101 is a periodic signal that is the same in period as the periodic signal S1 but shifted in phase by a quarter of the period.

When a Z-axial output Vz is being used, the switches SW11 and SW12 are off. Thus, the periodic signals S1 and S2 are input to the EX-OR element 81 with substantially no delay. Therefore, the waveforms at nodes X1 and X2 are the same as the waveforms of the periodic signals S1 and S2 being input to the respective terminals T100 and T101, as shown in (a) and (b) of FIG. 9.

In the EX-OR element 81, an exclusive-OR operation is performed between the signals, and the result is output to a node X3. In FIG. 9, (c) shows the waveform of the periodic signal at the node X3. The signal is converted into an analogue voltage by passing through the low-pass filter LF1, and then the converted signal is output to the terminal T91. In this embodiment, the X-axial output Vx output to the terminal T91 is substantially half the power supply voltage Vcc, as shown in (d) of FIG. 9.

Afterward, when the use of the Z-axial output Vz is stopped, the switches SW11 and SW12 are turned on. Therefore, in accordance with the capacitance values of the capacitance elements C1 and C2, the waveforms of the periodic signals at the nodes X1 and X2 become delayed waveforms as shown in (e) and (f) of FIG. 9. At this time, when no X-axial force is being applied, the capacitance values of the capacitance elements C1 and C2 are substantially equal to each other, and the delay times are also the same. The periodic signals having the delayed waveforms are input to the EX-OR element 81.

In the EX-OR element 81, an exclusive-OR operation is performed between the signals, and the result is output to the node X3. In FIG. 9, (g) shows the waveform of the periodic signal at the node X3. The signal is converted into an analogue voltage by passing through the low-pass filter LF1, and then the converted signal is output to the terminal T91. In this embodiment, the X-axial output Vx output to the terminal T91 is substantially half the power supply voltage Vcc, as shown in (h) of FIG. 9.

As described above, the X-axial output Vx scarcely changes before and after only a Z-axial operation is performed with applying no X-axial force. The same applies to the Y- and Z-axial outputs. Thus, when the capacitance type sensor 10 of this embodiment is applied to a joy stick, the continuousness of each output signal is ensured. The position of a cursor does not change before and after an operation using a Z-axial output. This makes a certain operation possible, and makes it possible to provide a joy stick high in reliability.

As described above, in the case that the capacitance type sensor 10 of this embodiment is applied to a joy stick as a pointing device, when the detective member 30 is depressed so as to be inclined in a direction in which a cursor is to be moved, the X- and Y-axial outputs change in accordance with the magnitude and direction of the depressing force, and thereby the cursor is moved. At this time, because the Z-axial output scarcely changes, an operation, such as clicking, using the Z-axial output is impossible. On the other hand, when the detective member 30 is depressed Z-axially, an operation, such as clicking, using the Z-axial output is possible. At this time, the X- and Y-axial outputs scarcely change, the cursor does not move. Thus, the movement of the cursor and the operation using the Z-axial output are exclusive operations, and they can not be performed at the same time. Thus, because the movement of the cursor and the operation using the Z-axial output are surely separated, an erroneous operation is prevented. In addition, when the diameter of the detective member 30 is set to be about the size of a finger, the movement of the cursor and the operation using the Z-axial output can surely be performed only by changing the inclination of the finger and the depressing force without separating the finger from the detective member 30. This provides a joy stick superior in operability.

When a Z-axial output is used, the switches SW51 to SW54 are turned on, and a Z-axial output is calculated on the basis of a change in the sum of the capacitance values of the capacitance elements C1 to C4. That is, the electrodes for X- and Y-axial outputs serve also as electrodes for a Z-axial output. Therefore, even when each of the electrodes for the X- and Y-axial outputs is small, the Z-axial output considerably changes and the sensitivity becomes high. In addition, there is no need of providing an electrode for the Z-axial output separately from the electrodes for the X- and Y-axial outputs. This makes it easy to reduce the size of the sensor.

In addition, by detecting states of the switches SW1 to SW4, it can be judged whether or not the detective member 30 is being operated. Therefore, the following control can be made. That is, by using a microcomputer or the like, the system is kept in a power-saving mode when the detective member 30 is not being operated. When the detective member 30 is operated and at least one of the switches SW1 to SW4 is switched over from OFF state to ON state, the microcomputer or the like detects the change in the signal and the system is restored to the normal use condition, that is, the system is waked up. Thus, in the system using the capacitance type sensor 10, when the detective button 30 is not operated for a long time, the power consumption can be reduced by changing into a sleep mode.

Other than the application to a joy stick that moves a cursor in directions of 360 degrees, the capacitance type sensor 10 of the present invention is suitable for an application for moving a cursor or the like in particular X- and Y-axially because the switches SW1 to SW4 are disposed on the X- and Y-axes. Therefore, the capacitance type sensor 10 of the present invention is most suitable for an application for indicating a desired object to select when object to select, such as icons, menus, or characters, are arranged vertically and horizontally.

Next will be described a capacitance type sensor according to a second embodiment of the present invention. The capacitance type sensor 110 according to the second embodiment differs from the capacitance type sensor 10 according to the first embodiment in the shape of the detective member. The same parts of the capacitance type sensor 110 as the capacitance type sensor 10 are denoted by the same reference numerals as those of the capacitance type sensor 10, respectively, and the detailed description thereof will be omitted.

A detective member 130 is made up of a small-diameter upper step portion 131 as a force receiving portion, and a large-diameter lower step portion 132 integrally formed under the upper step portion 131. The detective member 30 is disk-shaped as a whole. In addition, a rod-like protrusion 133 is formed on the upper step portion 131.

In this embodiment, because the protrusion 133 of the detective member 130 is Z-axially long. Thus, when the X- and Y-axial outputs Vx and Vy are intended to be changed, the protrusion 133 of the detective member 130 can be operated by applying a horizontal force, that is, a force parallel to the substrate 20.

Next will be described a capacitance type sensor according to a third embodiment of the present invention. The capacitance type sensor 210 according to the third embodiment differs from the capacitance type sensor 10 according to the first embodiment in the shape of the displacement electrode. The same parts of the capacitance type sensor 210 as the capacitance type sensor 10 are denoted by the same reference numerals as those of the capacitance type sensor 10, respectively, and the detailed description thereof will be omitted.

On the lower surface of a displacement electrode 140, circular protrusions 141, 142, and 145 are formed at positions corresponding to the X-axial positive direction, the X-axial negative direction, and the Z-axial direction, respectively. Not-shown circular protrusions are formed at positions corresponding to the Y-axial positive direction and the Y-axial negative direction, respectively. Because the protrusion 145 is closer to the substrate than the other protrusions, the supporting member 60 is deformed and the displacement electrode 140 is displaced, with the protrusion 145 serving as a fulcrum. The operator can sense the center of operation feeling of the detective member 30.

Although preferred embodiments of the present invention have been described above, the present invention is never limited to the above-described embodiments. Various changes in design can be made within the scope defined by the claims. For example, the displacement electrode 40 and the supporting member 60 are formed into separate bodies. In a modification, however, they may be formed into one body. In a modification, the displacement electrode 40 may not only be made of silicone rubber. For example, conductive ink or conductive coating may be applied on non-conductive silicone rubber; or a conductive metal film may be formed on non-conductive silicone rubber by vapor deposition or sputtering. Further, a conductive thermoplastic resin, such as PPT or elastomer, or a conductive plastic, may be used for the displacement electrode 40. That is, the displacement electrode 40 may be made of a flexible conductive member or a flexible non-conductive member on which a conductive member has been formed. In another modification, the supporting member 60 may be made of not silicone rubber but a resin film or a thin metal.

In the above-described embodiments, the protrusions 41 to 44 of the displacement electrode 40 has the same height. In a modification, however, the protrusions 41 to 44 may be different in height. In another modification, such protrusions 41 to 44 may not be formed.

In the above-described embodiments, the switch outputs of the switches SW1 to SW4 are used only for controlling the capacitance type sensor of the present invention. In a modification, however, the switch outputs of the switches SW1 to SW4 may be also used for another control.

A schematic sectional view of a capacitance type sensor according to a first embodiment of the present invention.

FIG. 2

Figure 1:
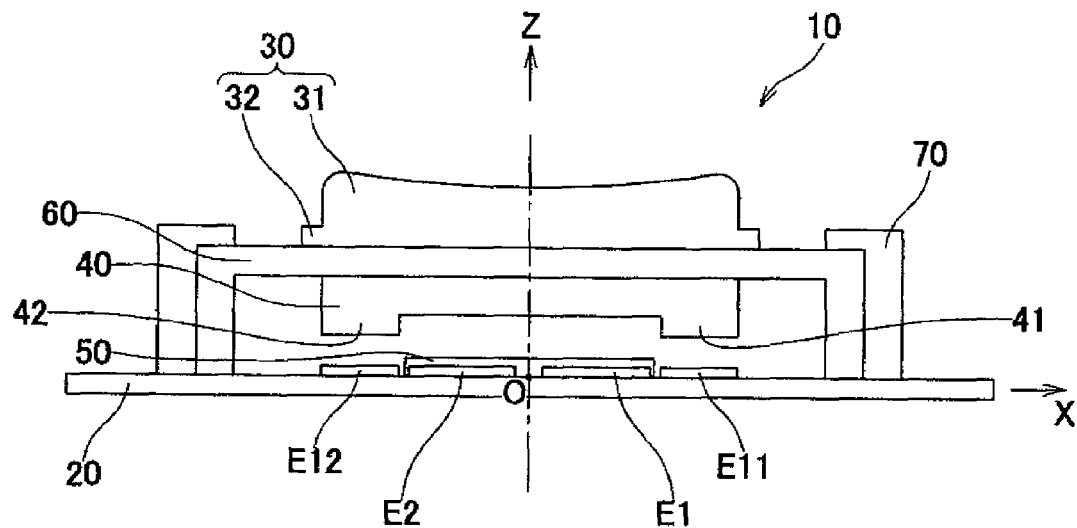
FIG. 1
Figure 2:
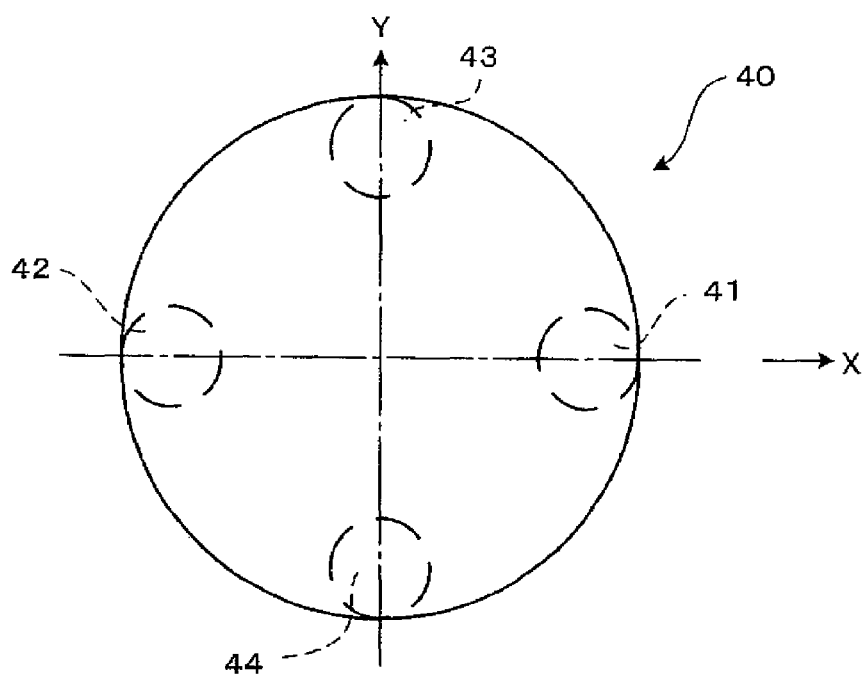
Figure 3:
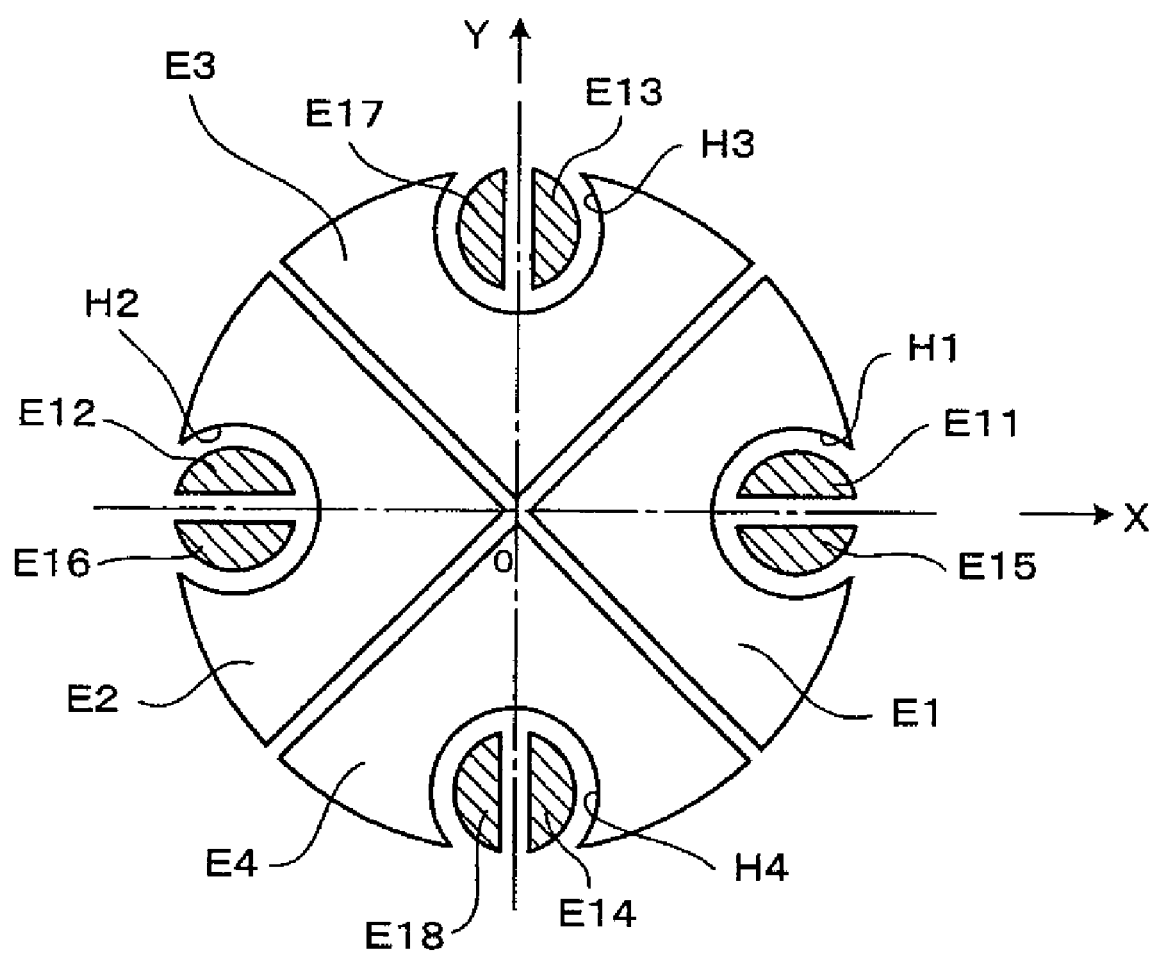
Figure 4:
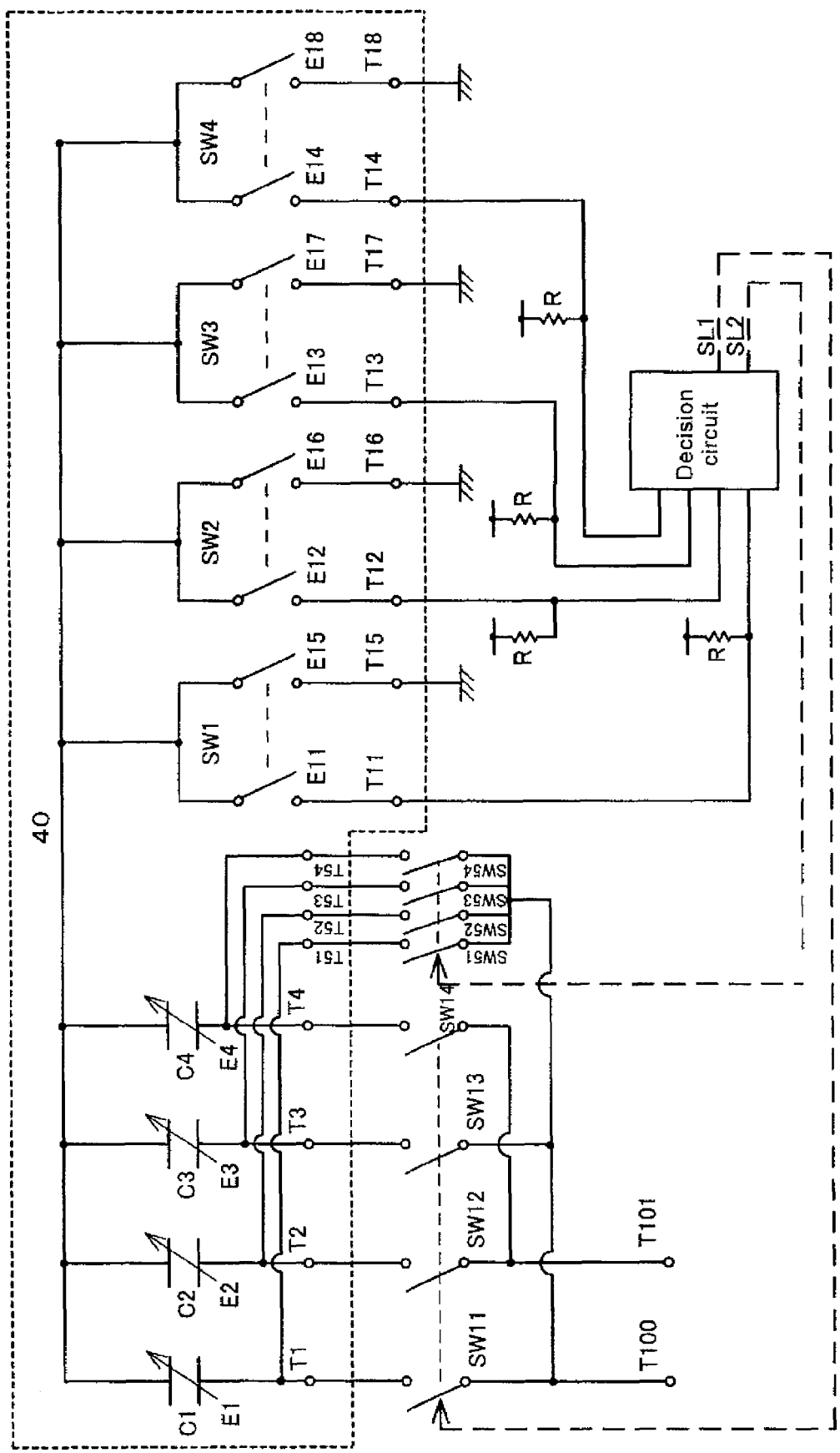
Figure 5:
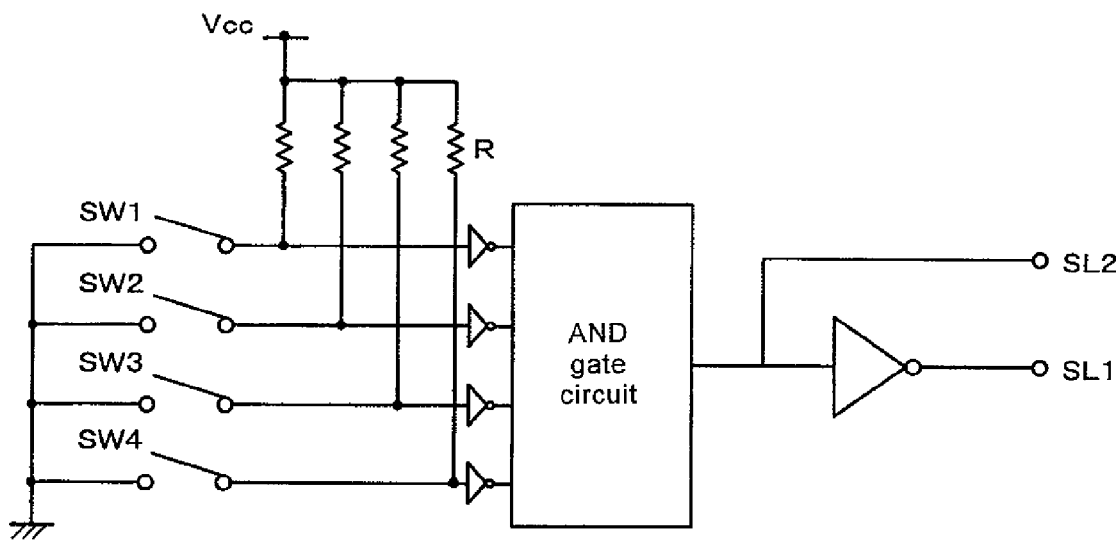
Figure 6:
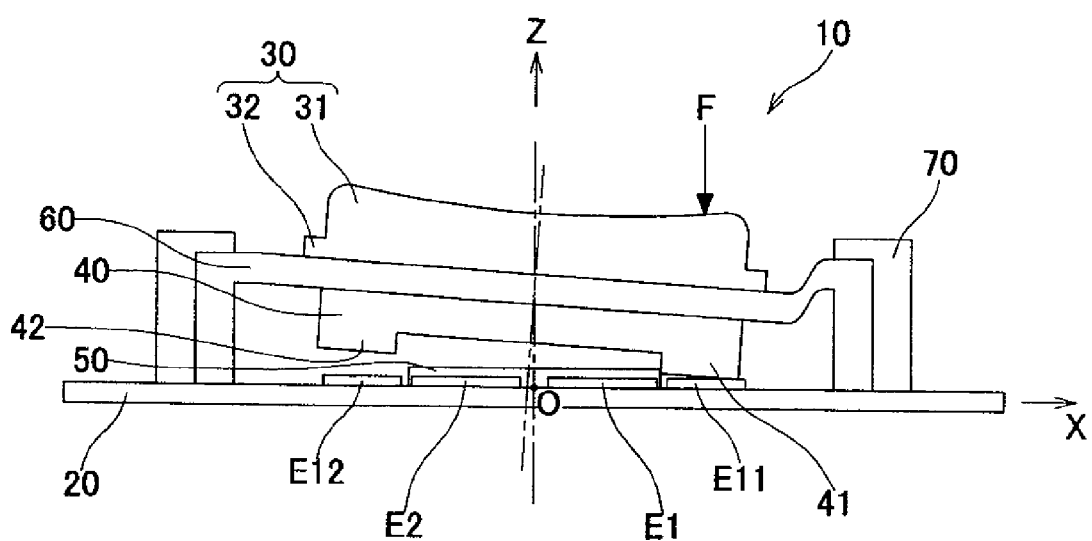
Figure 7:
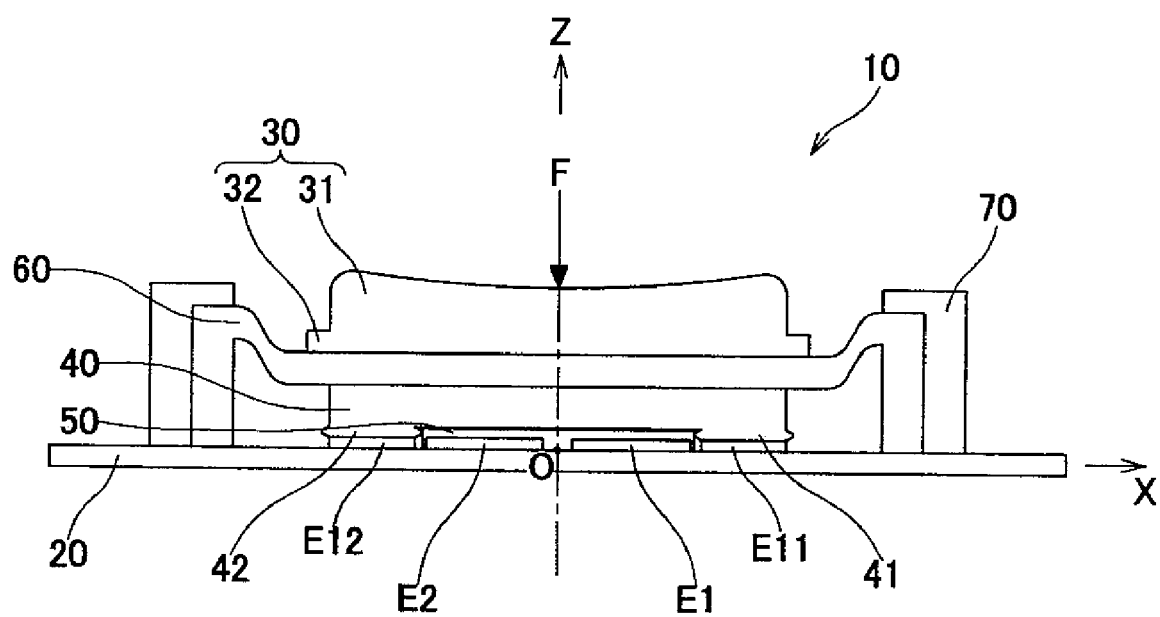

An upper view of a displacement electrode of the capacitance type sensor of FIG. 1.

FIG. 3

A view showing an arrangement of a number of electrodes formed on a substrate of the capacitance type sensor of FIG. 1.

FIG. 4

A circuit diagram showing a construction of the capacitance type sensor shown in FIG. 1.

FIG. 5

A circuit diagram showing a construction of a decision circuit.

FIG. 6

A sectional view when a force is applied to an X-axial positive portion of a detective member of the capacitance type sensor shown in FIG. 1.

FIG. 7

A sectional view when a force is applied to a central portion of the detective member of the capacitance type sensor shown in FIG. 1.

FIG. 8

A circuit diagram showing an example of a signal processing circuit for the capacitance type sensor shown in FIG. 1.

FIG. 9

Figure 8:
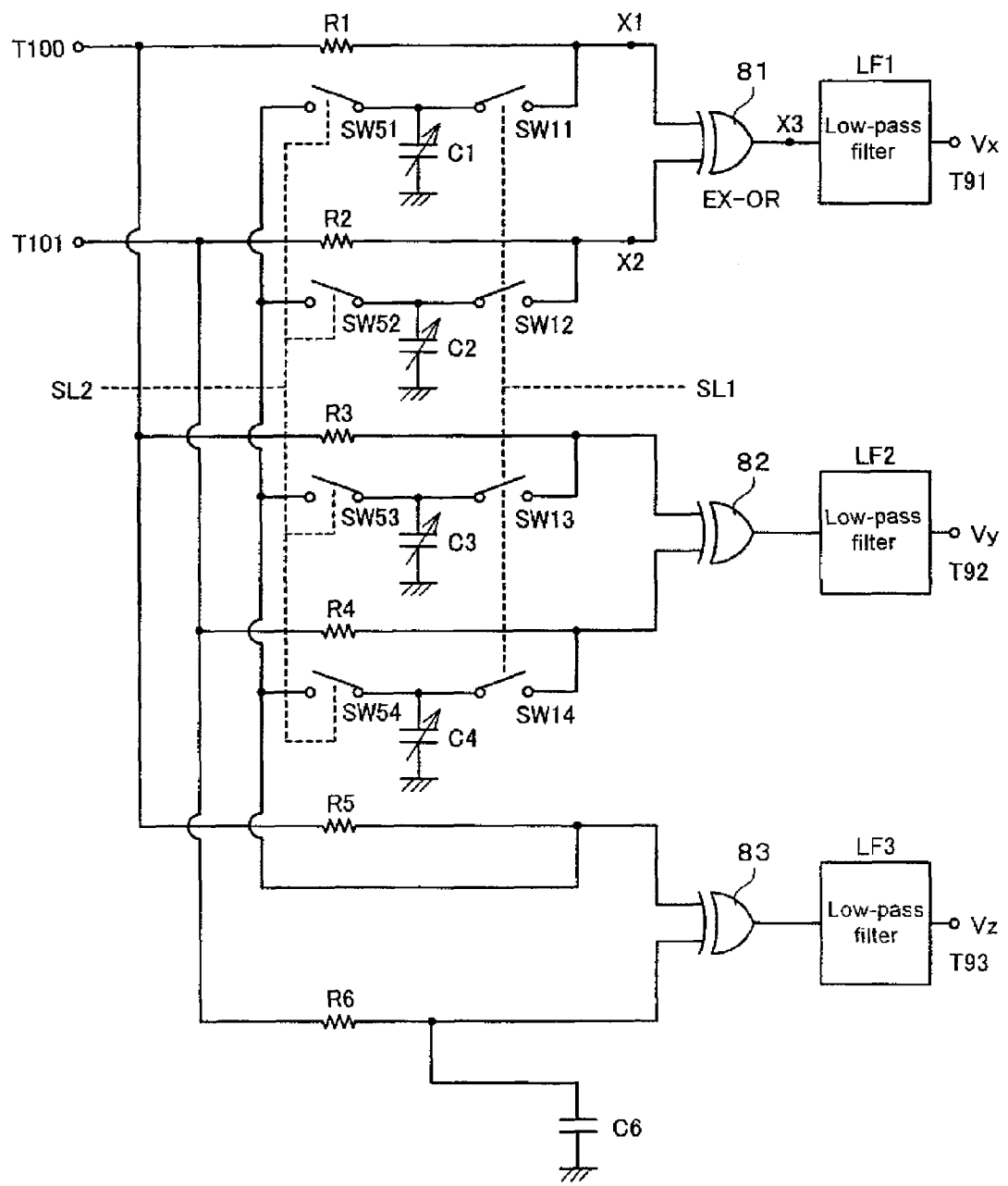
Figure 9:
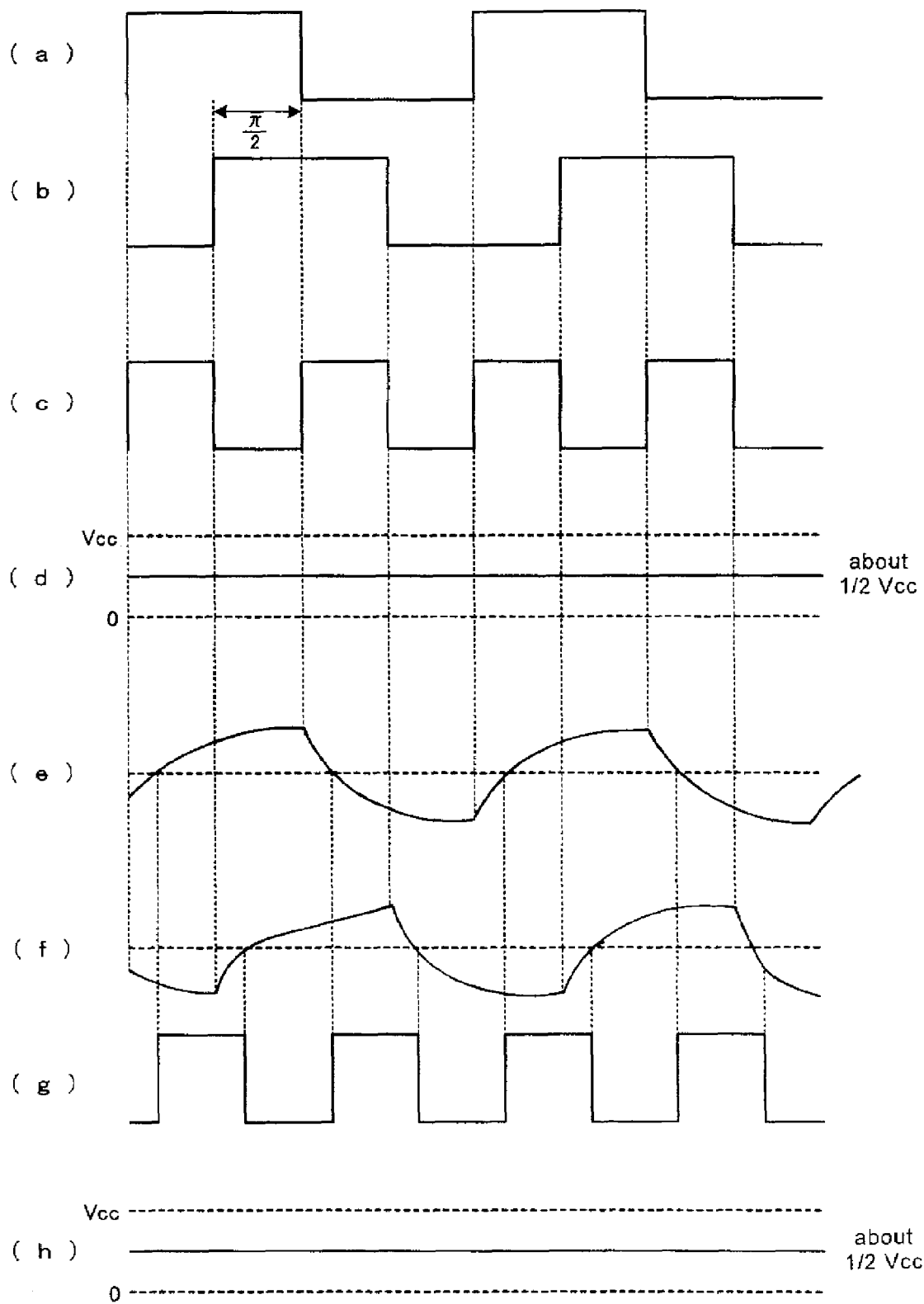
Figure 10:
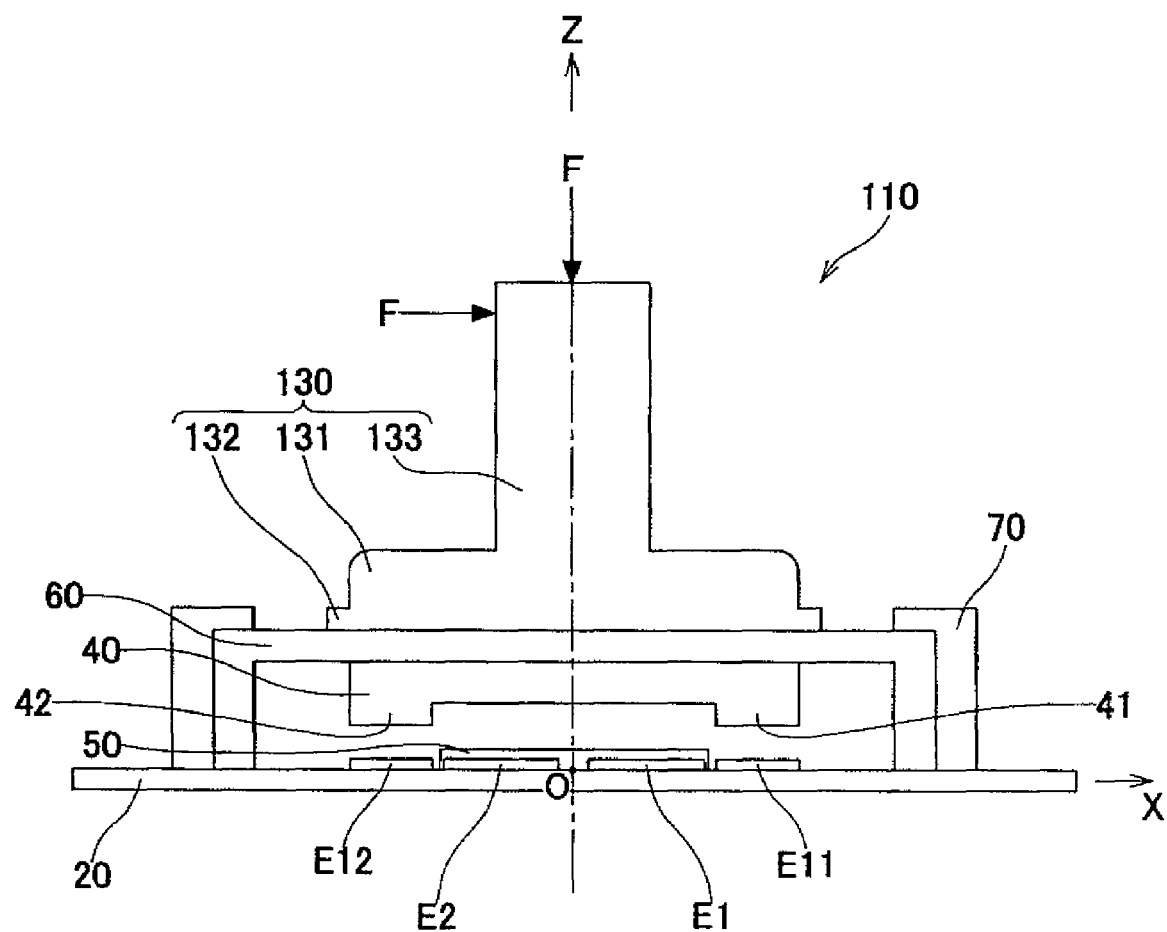
Figure 11:
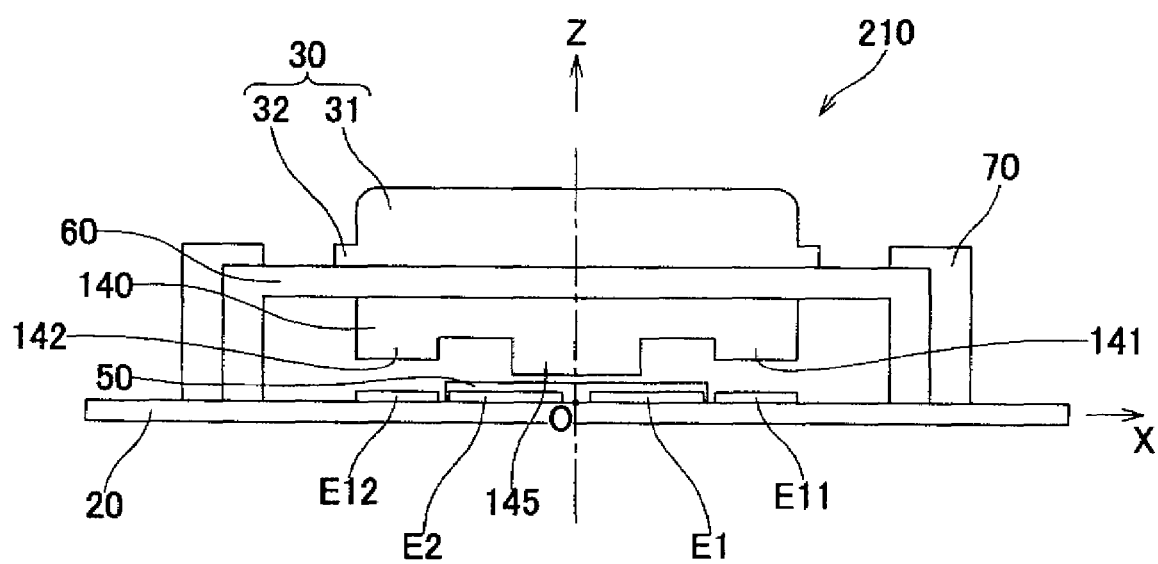

A timing chart showing the waveforms of periodic signals at each terminal and each node of the signal processing circuit shown in FIG. 8.

FIG. 10

A schematic sectional view of a capacitance type sensor according to a second embodiment of the present invention.

FIG. 11

A schematic sectional view of a capacitance type sensor according to a third embodiment of the present invention.

DESCRIPTION OF REFERENCE NUMERALS 10, 110, 210: capacitance type sensor
20: substrate
30, 130: detective member
40, 140: displacement electrode (conductive member)
E1, E2: capacitance electrode (X-axial electrode)
E3, E4: capacitance electrode (Y-axial electrode)
E11 to E14: switch electrode (second switch electrode)
E15 to E18: switch electrode (first switch electrode)

The invention claimed is:

1. A capacitance type sensor characterized in that the sensor comprises:

a substrate that defines an XY plane;
a detective member opposed to the substrate;
a conductive member disposed between the substrate and the detective member with being kept in an insulating state so that the conductive member can be displaced in the same direction as the detective member when the detective member is displaced along a Z-axis perpendicular to the substrate;
an X-axial electrode formed on an X-axis on the substrate so as to cooperate with the conductive member to form a first capacitance element;
a Y-axial electrode formed on a Y-axis on the substrate so as to cooperate with the conductive member to form a second capacitance element;
a plurality of first switch electrodes disposed so as to be distant from the conductive member and kept at a ground potential; and
a plurality of second switch electrodes disposed so as to be distant from the conductive member and cooperate with the respective first switch electrodes to make pairs, and kept at a potential different from the ground potential, the conductive member can be displaced toward the X- and Y-axial electrodes with displacement of the detective member, and come into contact with a plurality of pairs of first and second switch electrodes, the displacement of a portion of the detective member corresponding to an X-axial direction can be detected on the basis of detection of a change in the capacitance value of the first capacitance element due to a change in the distance between the conductive member and the X-axial electrode, by using only a signal input to the X-axial electrode, and the displacement of a portion of the detective member corresponding to a Y-axial direction can be detected on the basis of detection of a change in the capacitance value of the second capacitance element due to a change in the distance between the conductive member and the Y-axial electrode, by using only a signal input to the Y-axial electrode, when the conductive member is not in contact with at least one of the plurality of pairs of first and second switch electrodes, and the displacement of the detective member can be detected on the basis of detection of a change in the sum of the capacitance values of the first and second capacitance elements due to changes in the distances between the conductive member and the X- and Y-axial electrodes, by using both of signals input to the respective X- and Y-axial electrodes, when the conductive member is in contact with all of the plurality of pairs of first and second switch electrodes.

2. The capacitance type sensor according to claim 1, characterized by comprising:

a pair of X-axial electrodes being X-axially distant from each other so as to be symmetrical with respect to the Y-axis; and
a pair of Y-axial electrodes being Y-axially distant from each other so as to be symmetrical with respect to the X-axis.

3. The capacitance type sensor according to claim 1, characterized in that the plurality of pairs of first and second switch electrodes are disposed at positions corresponding to the respective X- and Y-axial electrodes.

4. The capacitance type sensor according to claim 2, characterized in that the plurality of pairs of first and second switch electrodes are disposed at positions corresponding to the respective X- and Y-axial electrodes.

* * * * *